United States Patent [19]

Maurinus et al.

[11] Patent Number: 5,021,811
[45] Date of Patent: Jun. 4, 1991

[54] RECYCLEABLE ELEMENT RECYCLE COUNTER AND METHOD

[75] Inventors: Martin A. Maurinus; Norbert Koenig, both of Rochester, N.Y.

[73] Assignee: Eastman Kodak Company, Rochester, N.Y.

[21] Appl. No.: 541,872

[22] Filed: Jun. 21, 1990

[51] Int. Cl.$^5$ ............... G03B 15/03; G03B 19/02; H01R 3/00
[52] U.S. Cl. ............... 354/76; 354/127.1; 354/289.1; 439/491
[58] Field of Search ........... 439/488, 491; 354/75, 354/76, 127.1, 289.1, 465

[56] References Cited

U.S. PATENT DOCUMENTS

| | | | |
|---|---|---|---|
| 1,949,141 | 2/1934 | Blaylock | 40/21 |
| 3,621,116 | 11/1971 | Ada | 174/68.5 |
| 4,340,774 | 7/1982 | Nilsson et al. | 174/138 G |
| 4,801,957 | 1/1989 | Vandemoere | 354/147 |
| 4,903,058 | 2/1990 | Schappler | 354/145.1 |

Primary Examiner—Michael L. Gellner
Attorney, Agent, or Firm—Michael Balconi-Lamica

[57] ABSTRACT

A recycleable element includes a means for visually indicating the number of times the element has been recycled whereby the indicating means is updateable each time the element is recycled, up to a maximum recycleable life of the element. Such a recycleable element is particularly useful in a recycleable film pack single-use camera having a built-in electronic flash unit.

20 Claims, 4 Drawing Sheets

RECYCLEABLE ELEMENT RECYCLE COUNTER AND METHOD

BACKGROUND OF THE INVENTION

1. Field of the Invention

This invention relates to the field of photography, and more specifically to a recycleable film pack single-use camera having a built-in electronic flash unit.

2. Description of the Related Art

In today's society, more and more emphasis is being placed upon ecology and the preservation of the environment. A number of consumer products are produced that are classified as disposable; that is, the product is used once and then disposed of. An example of such a disposable consumer product is a single-use camera having a built-in electronic flash unit.

Generally, one known form of a single-use 35 mm camera having a built-in electronic flash unit is a point-and-shoot type camera and comprises (1) a plastic inner camera part including a taking lens, a film metering mechanism, and a shutter; (2) an electronic flash unit comprising a printed circuit board assembly provided with a flash reflector and (3) a cardboard outer sealed pack which contains the inner camera part and the electronic flash unit. The cardboard outer sealed pack further has respective openings for the taking lens, a shutter button, a frame counter window, a film advance thumbwheel, a simple see-through viewfinder of the inner camera part, the flash reflector, a flash ready indicator and a flash on/off switch. At the manufacturer, the inner camera part is typically loaded with a conventional 24-exposure 35 mm film cartridge and substantially the entire length of the unexposed filmstrip is factory pre-wound from the cartridge into a supply chamber of the inner camera part. After the customer takes a picture, the thumbwheel is manually rotated to rewind the exposed frame into the cartridge. The rewinding movement of the filmstrip, the equivalent of one frame, rotates a metering sprocket to decrement a frame counter to its next lower numbered setting When a flash picture is desired, the customer turns on the flash on/off switch, waits for flash ready indication, and then takes the flash picture. When substantially the entire length of the filmstrip is exposed and rewound into the cartridge, the single-use camera is sent to a photofinisher who first removes the inner camera part from the cardboard sealed pack and then removes the cartridge containing the filmstrip from the camera part. The cartridge containing the filmstrip is processed, and the inner camera part, the electronic flash unit, and the opened pack are disposed of.

One disadvantage of this arrangement is that the selling price of the camera assembly is significantly increased because of the electronic flash unit.

Another disadvantage is that the disposal of the electronic flash unit is a waste of resources and takes away from the preservation of the environment.

SUMMARY OF THE INVENTION

In the example given above, the electronic flash unit of the single-use 35 mm camera constitutes a recycleable element, the unit being a large percentage of the overall cost of the camera. It is economically advantageous to recycle the electronic flash unit. Recycling the unit is also good for ecology and for preservation of the environment. Although recycleable, the electronic flash unit has a limited lifetime. It is therefore desirable to keep track of the number of times the electronic flash unit is recycled.

According to the invention, a recycleable element is provided with a recycle counter, whereby the number of times that the recycleable element has been recycled is visually indicated thereon and is updated each time recycled, up to the maximum recycleable life of the element.

One advantageous feature of the present invention is the provision of an inexpensive means for visually indicating the number of times an element has been recycled.

Another feature of the present invention is the provision of a method of recycling an element, including updating a recycle counter to indicate the number of times an element has been recycled.

These and other advantages and features of the present invention will become apparent upon reading the following detailed description of the preferred embodiment.

DETAILED DESCRIPTION OF THE PREFERRED EMBODIMENT

The invention is disclosed in connection with a 35 mm camera having a built-in electronic flash unit. Because such a camera and flash unit are widely known, this description is directed in particular to photographic elements forming part of or cooperating directly with the invention. It is to be understood, however, that other elements not specifically shown or described may take various forms known to persons of ordinary skill in the art.

Figure 1:
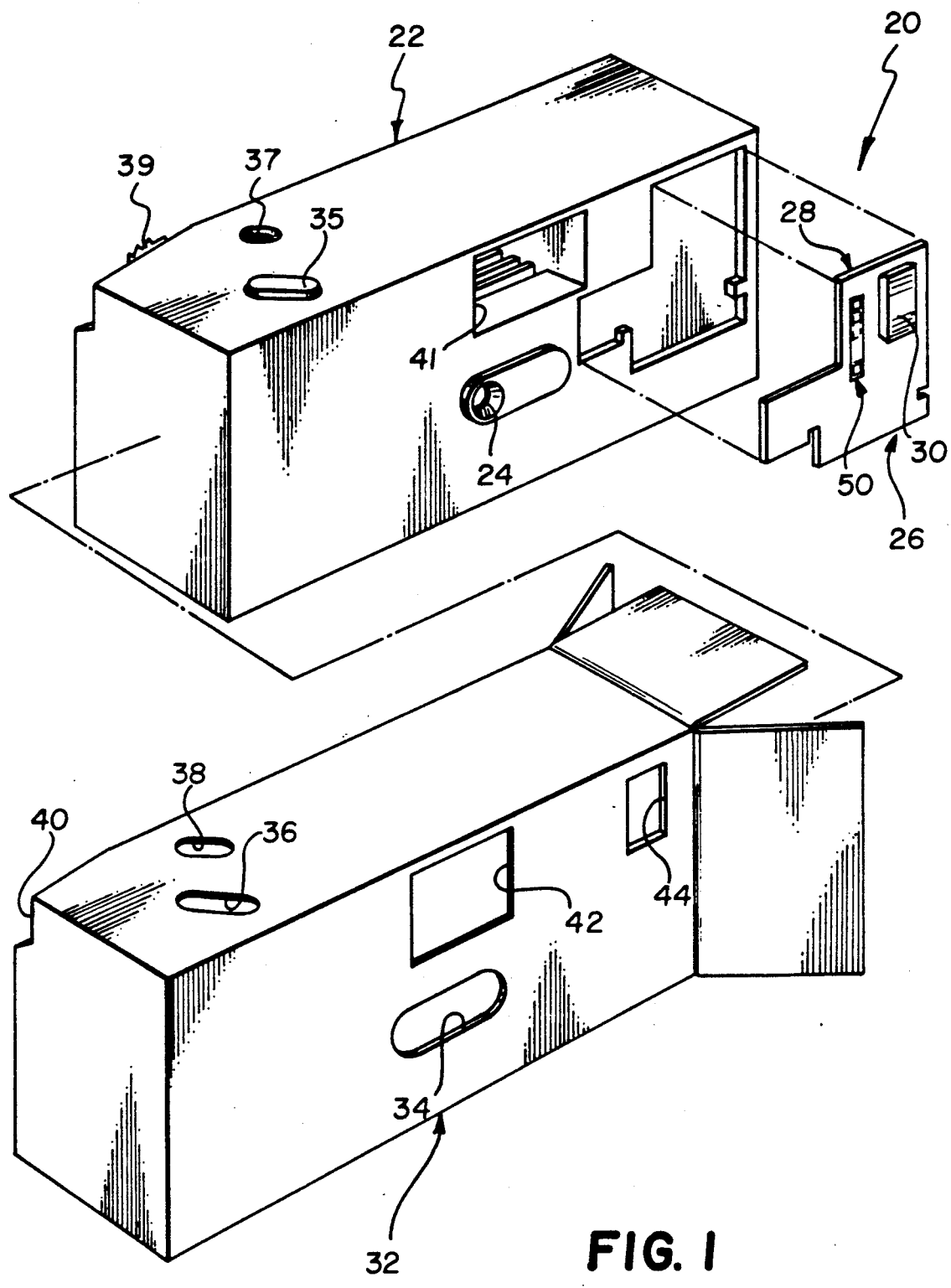
FIG. 1 is an exploded view of a film pack single-use camera, having a built-in flash.
Figure 2:
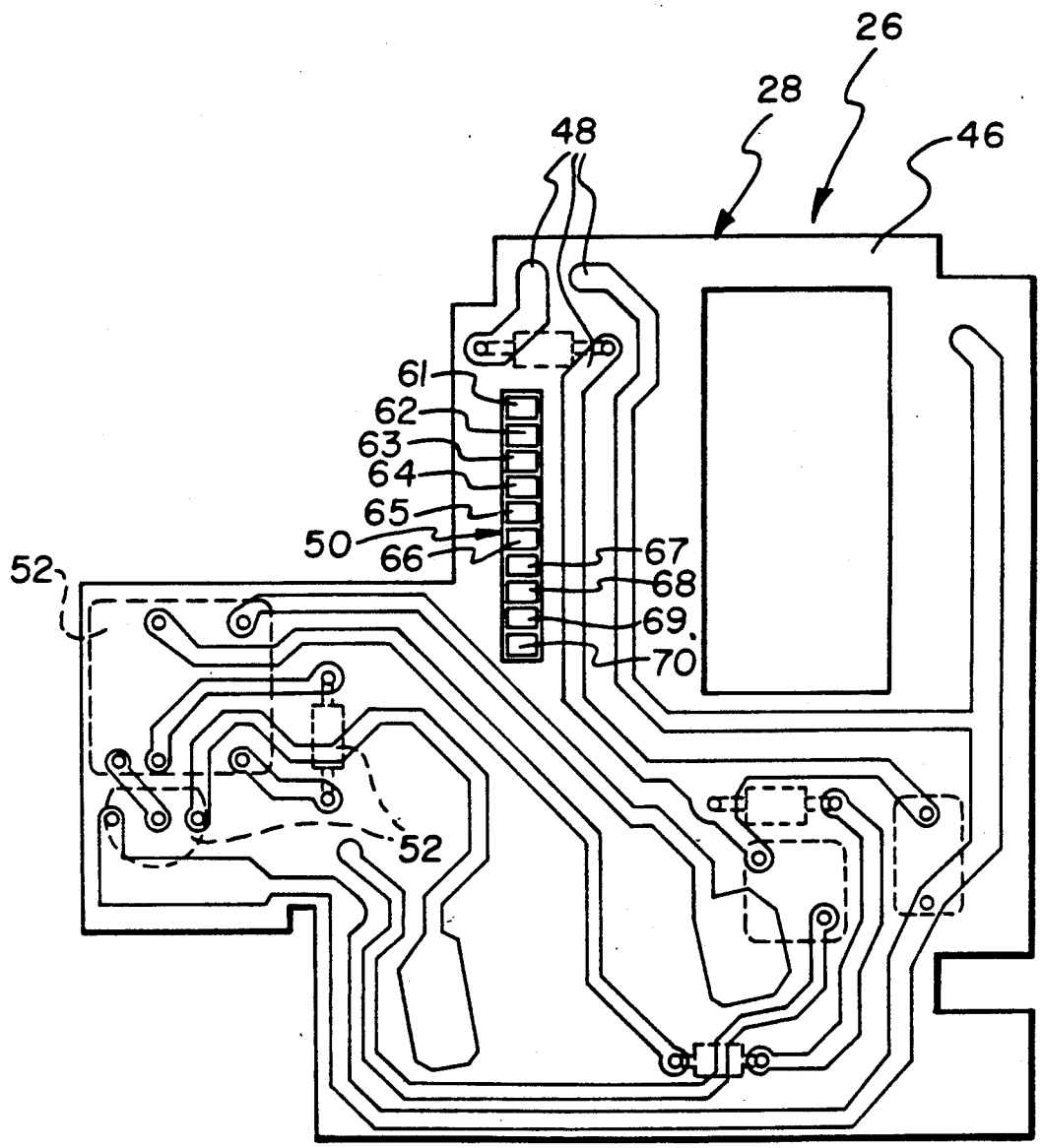
FIG. 2 is a portion of a printed circuit board assembly having a recycle counter thereon, according to a preferred embodiment of the invention.

Referring now to the drawings, FIG. 1 depicts a film pack single-use 35 mm camera (which is hereafter referred to as a film pack camera) with a built-in electronic flash unit. As shown in FIGS. 1 and 2, the film pack camera 20 is a point-and-shoot type and comprises (1) an inner camera part 22 including a taking lens 24, a film metering mechanism (not shown), and a single blade shutter (not shown), (2) an electronic flash unit 26 including flash/charger electronic circuit board assembly 28 and (3) outer sealed pack 32 which contains the inner camera part 22 and the electronic flash unit 26. The outer sealed pack 32 has respective openings 34, 36, 38, 40, 42, and 44 for the taking lens 24, a shutter release button 35, an exposure counter 37, a film advance thumbwheel 39, a direct see-through viewfinder 41, and a flash reflector 30, respectively. The outer sealed pack 32 is decorative in nature and is constructed of a paper-like material, such as cardboard. The inner camera part 22 is preferably constructed of an inexpensive material such as a plastic. The electronic flash unit 26 is adapted to be mated with the inner camera part 22.

At the manufacturer, the inner camera part 22 is loaded with a conventional 24-exposure 35 mm film cartridge and substantially the entire length of the unexposed filmstrip is factory prewound from the cartridge onto a take-up spool (not shown) of the camera part. With film pack camera 20, a customer can take either flash or non-flash pictures. When a flash picture is desired, the customer turns on the electronic flash unit 26 via a flash on/off switch (not shown) prior to taking the picture. After the customer takes a picture by depressing the release button 35, the thumbwheel 39 is manually rotated to rewind the exposed frame into the cartridge. The rewinding movement of the filmstrip the equivalent of one frame rotates a metering sprocket (not shown) to decrement the frame counter 37 to its next lower numbered setting. When substantially the entire length of the filmstrip is exposed and rewound into the cartridge, the film pack camera 20 is sent to a photofinisher who first removes the inner camera part 22 from the cardboard sealed pack 32 and then removes the filmstrip from the camera part. The filmstrip is processed; the camera part 22 and electronic flash unit 26 are recycled; and the outer opened pack 32 is disposed of or recycled.

According to the invention, recycle counter 50 is disposed on the printed circuit board assembly 28 as shown in FIG. 2. For purposes of illustration, assembly 28 is a flash/charger assembly of electronic flash unit 26 of camera 20. Assembly 28 includes flash reflector 30 and can be recycled a number of times, up to its maximum recycleable life, for example, ten times. The maximum recycleable life of assembly 28 is determined by certain factors, such as, the flash life of flash reflector 30 or some other factor as determined by the manufacturer. Assembly 28 comprises circuit board 46 having circuit leads 48 and circuit components 52 mounted thereon. Recycle counter 50 comprises tally boxes 61 thru 70 and is adapted to be marked each time assembly 28 is recycled. When marked, each marked box of boxes 61 thru 70 is representative of one time recycled. In addition, the total number of marked boxes of boxes 61 thru 70 is indicative of the number of times assembly 28 has been recycled.

Recycle counter 50 of the present invention is fabricated with the manufacture of printed circuit board 46. Circuit board 46 is readily manufactured using the additive or subtractive processes that are well known in the art. For example, in the subtractive process, copper is selectively removed by etching a copper-covered substrate according to a desired circuit pattern. Preferably, a desired pattern of recycle counter 50 is included into the artwork of the desired circuit pattern. Thus, recycle counter 50 is made simultaneously with the making of circuit board 46 at a minimal cost. Recycle counter 50 is shown having ten tally boxes, 61 thru 70. This is exemplary only and is not intended to be limiting. Recycle counter 50 may include more indicia and may also take other forms. For example, recycle counter 50 could be fabricated as a counter dial instead of tally boxes.

Alternatively, counter 50 can be produced by a silk screening process. For instance, board 46 could be produced with indicia representing a part number, component listings, or the like. Such indicia would be disposed on the surface of board 46 according to a desired pattern via silk screening with an appropriate ink. In such an instance, counter 50 would be included in the desired silk screening pattern and be simultaneously disposed on board 46 with the other indicia.

OPERATION

Figure 3:
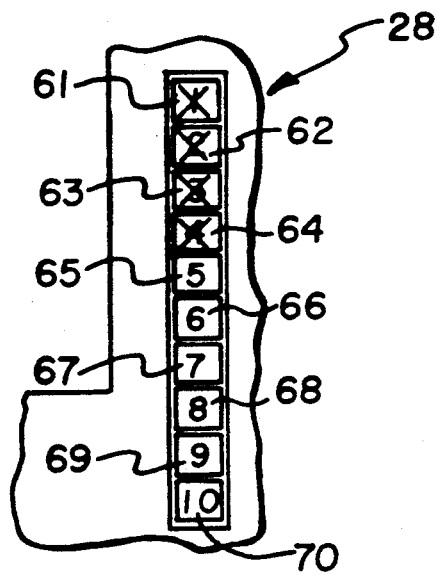
FIG. 3 is a view of the recycle counter of the present invention indicating that the printed circuit board assembly has been recycled four times.
Figure 4:
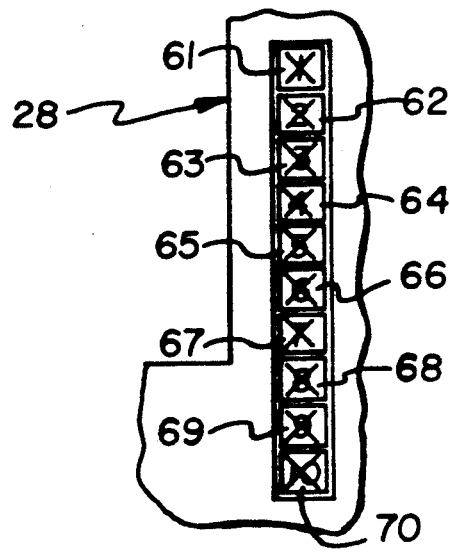
FIG. 4 is a view of the recycle counter of the present invention indicating that the printed circuit board assembly has been recycled the maximum number of times recycleable.

Using recycle counter 50 is as follows. Assembly 28 is returned to the manufacturer to be recycled and then recycle counter 50 is updated with an appropriate permanent mark, such as, an "X" made with a china marker or the like. A permanent mark is desired to ensure against accidental erasure of the mark during any subsequent handling of assembly 28. Counter 50 is updated by marking only one of tally boxes 61 thru 70 each time assembly 28 is recycled. As shown in FIG. 3, tally boxes 61 thru 70 of recycle counter 50 are numbered from a minimum number to a maximum number. Counter 50 has been updated four times to indicate that assembly 28 has been recycled four times. When assembly 28 has been recycled a maximum number of times, counter 50 will have no more tally boxes left to be updated, as shown in FIG. 4.

Figure 5:
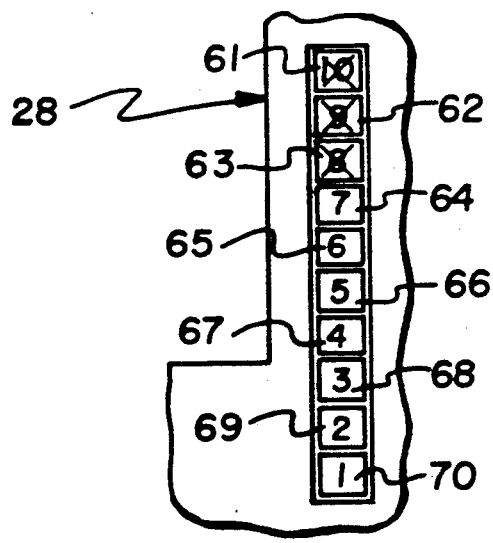
FIG. 5 is a view of the recycle counter of the present invention indicating that the printed circuit board assembly can be recycled seven more times in its recycleable life.

So far, there has been discussed the manner in which counter 50 indicates the number of times assembly 28 has been recycled. Alternatively, counter 50 also can indicate the number of times assembly 28 can be recycled. For example, tally boxes 61 thru 70 can be numbered from a maximum number to a minimum number as shown in FIG. 5. In FIG. 5, counter 50 indicates that assembly 28 can be recycled seven more times.

Figure 6:
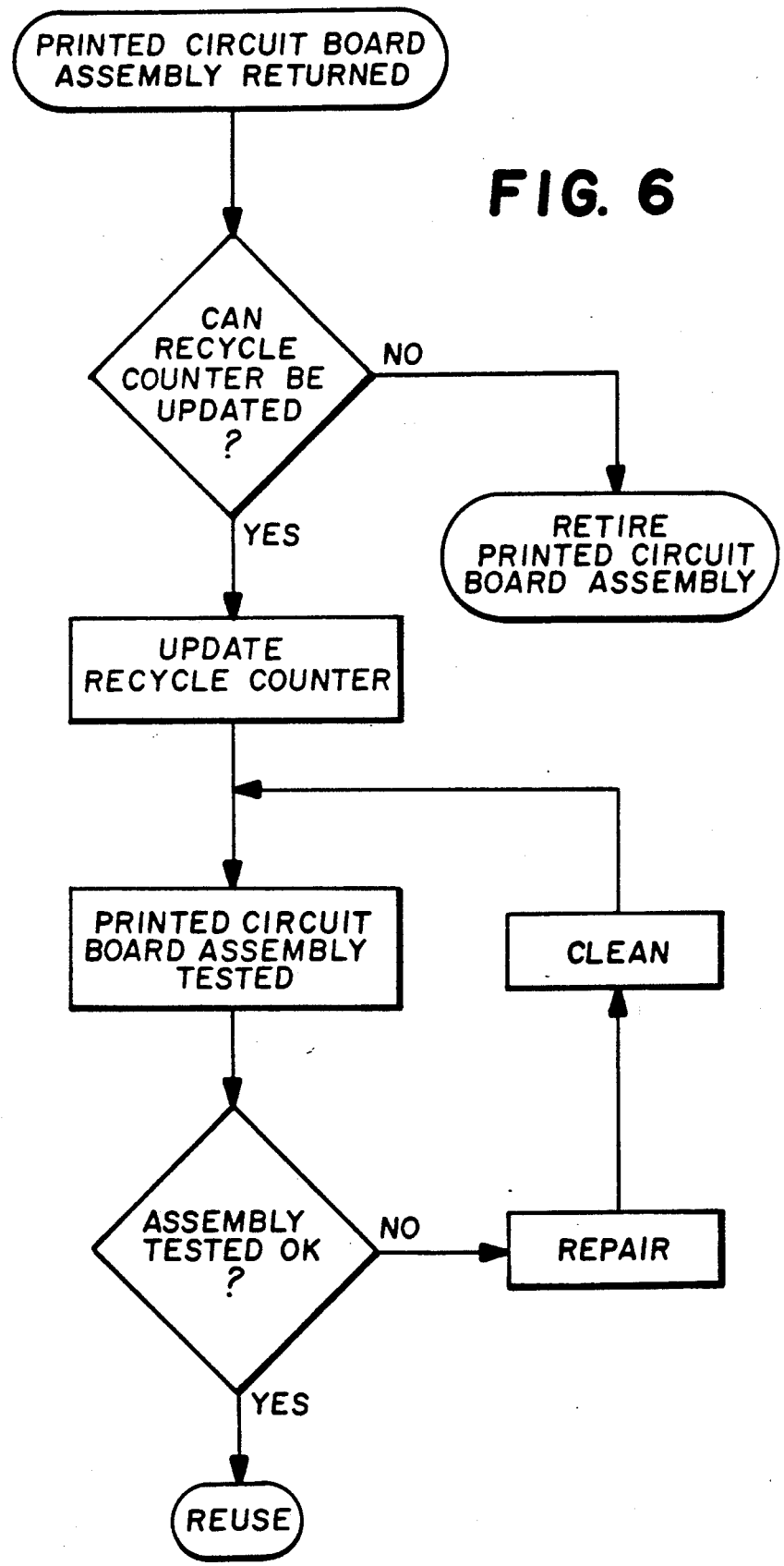
FIG. 6 is a flow diagram of the method of recycling according to the present invention.

A method of recycling printed circuit board assembly 28 according to the invention will now be discussed with reference to FIG. 6. After all exposures are taken, camera 20 is sent to the photofinisher for processing as discussed earlier. The camera part 22 and, in particular, the electronic flash unit 26, including assembly 28, are returned to the manufacturer for recycling. Once assembly 28 is returned, it is determined whether or not counter 50 can be updated. The determination involves looking at counter 50 to see if any of tally boxes 61 thru 70 can be marked. If no more tally boxes can be marked, as shown in FIG. 4, then assembly 28 has been recycled its maximum number of times and will be retired. Retiring assembly 28 includes salvaging reuseable components of assembly 28. On the other hand, if there remain any tally boxes 61 thru 70 left to be marked, as shown in FIG. 3, then counter 50 is updated and assembly 28 proceeds through the recycling process. Counter 50 is updated by marking a single unmarked tally box of boxes 61 thru 70 each time assembly 28 is recycled. Preferably, the order of marking individual unmarked boxes of counter 50 is by marking an unmarked tally box adjacent to a marked tally box, consecutively, each time updated. If assembly 28 is being recycled for the first time, then preferably, one of the end tally boxes 61 or 70 is marked. This preferred order of marking allows quick and easy determination of whether there are any boxes left to be marked, although this preferred order is not an absolute requirement.

Once the recycle counter 50 is updated, then assembly 28 is tested to ensure that it is operational. That is, even though assembly 28 has not been recycled its maximum number of times, assembly 28 must test functional or operational prior to its reuse in a successive camera. If assembly 28 tests negative, or nonfunctional, then it is repaired, cleaned, and retested. When assembly 28 tests positive, it is then reused in a successive camera.

The invention has been described and shown with connection to a flash/charger circuit board assembly for successive uses in a film pack single-use camera. The invention is equally applicable to other recycleable elements. For example, the recycle counter of the present invention could be disposed on a side surface of inner camera part 22 to indicate the number of times camera part 22 has been recycled. Recycle counter 50 can be manufactured simultaneously with the fabrication of camera part 22 at a minimal cost.

The recycle counter and the method of recycling of the present invention are also equally applicable to other circuit board assemblies. For example, a photocopier which contains printed circuit board assemblies may require maintenance involving the replacement of a printed circuit board assembly. The recycle counter of the present invention can be disposed on each photocopier printed circuit board assembly. Thus, a removed printed circuit board assembly may be recycled and the recycle counter of the present invention would indicate the number of times the board assembly has been recycled.

While the invention has been particularly shown and described with respect to the certain preferred embodiments thereof, it will be understood by those skilled in the art that the foregoing and other changes in form and details may be made therein without departing from the spirit and scope of the invention.

What is claimed is:

1. A film pack single-use camera having a recycleable element, wherein the improvement comprises:
    a recycle counter for visually indicating the number of times said recycleable element has been recycled, said recycle counter being disposed on said recycleable element and adapted to be updated each time said element is recycled, wherein said recycle counter comprises a range of indicia, wherein each indicia indicates a specific number of times recycled, said range of indicia being from a minimum to a maximum, said maximum representative of the maximum recycleable life of said recycleable element.

2. A recycleable element to be recycled a number of times in successive film pack single-use cameras, wherein the improvement comprising:
    a recycle counter for visually indicating the number of times said recycleable element has been recycled, said recycle counter adapted to be updated each time said recycleable element is recycled.

3. An improved printed circuit board assembly including a flash charger circuit board, circuit components, and a flash reflector intended to be recycled for successive uses in a film pack single-use camera comprising an (a) inner camera part pre-loaded with film and including a taking lens and a shutter and (b) an outer sealed pack containing said camera part and having openings for said taking lens and said flash reflector, wherein the improvement comprises:
    a recycle counter disposed on said printed circuit board assembly to visually indicate the number of times said assembly has been recycled, said recycle counter adapted to be updated each time said assemblY is recycled.

4. The improved printed circuit board assembly as recited in claim 3, wherein said recycle counter includes a number of indicia, said number of indicia being equal to the maximum number of times said assembly can be recycled.

5. The improved printed circuit board assembly as recited in claim 4, wherein said indicia comprise tally boxes.

6. A recycleable element to be recycled a number of times, wherein the improvement comprises:
    recycle indicia for indicating the number of times said element can be recycled, said recycle indicia adapted to be updated each time said recycleable element is recycled, whereby said updated indicia is representative of the number of times said element has been recycled.

7. A recycleable printed circuit board assembly to be recycled a number of times comprises:
    a printed circuit board having circuit components thereon; and
    means for indicating the number of times said printed circuit board assembly has been recycled, said indicating means adapted to be updated each time said assembly is recycled.

8. The recycleable printed circuit board assembly as recited in claim 7, further wherein said indicating means is disposed on a surface of said printed circuit board of said printed circuit board assembly.

9. The recycleable printed circuit board assembly as recited in claim 8, wherein said indicating means includes a range of indicia, said range being from a minimum to a maximum, wherein said maximum is representative of a maximum recycleable life of said printed circuit board assembly.

10. The recycleable printed circuit board assembly as recited in claim 9, further wherein said range of indicia comprises a plurality of tally boxes.

11. The recycleable printed circuit board assembly as recited in claim 10, further wherein said tally boxes are numbered consecutively from a minimum number to a maximum number.

12. A method of indicating the number of times a recycleable element has been recycled, comprising the steps of:
    (1) providing visual indicia on said recycleable element, said indicia adapted to be marked and being in the form of tally boxes, the number of tally boxes being equal to the range of recycleable life of said element, said range being from a minimum to a maximum number of times recycleable; and
    (2) marking said visual indicia by marking only one tally box each time said recycleable element is recycled, up to the maximum number of times recycleable.

13. A method of recycling a recycleable element, comprising the steps of:
    (1) providing visual indicia to indicate the number of times said element has been recycled, said visual indicia adapted to be updated and being disposed on said element;
    (2) updating the visual indicia each time said element is recycled; and
    (3) retiring said element after the visual indicia can no longer be updated.

14. The method of recycling a recycleable element as recited in claim 13, wherein further said step of providing visual indicia includes providing a plurality of indicia, wherein each indicia of said plurality is representative of a distinct number of times recycled, beginning with a minimum number and consecutively increasing to a maximum number.

15. The method of recycling a recycleable element as recited in claim 14, wherein said step of updating said visual indicia includes permanently marking said visual indicia, said marking initially being done to the visual indicia representative of the minimum number of times recycled and thereafter being done consecutively in increasing order each time said recycleable element is recycled.

16. The method of recycling a recycleable element as recited in claim 15, wherein said step of retiring includes salvaging reuseable components of said element.

17. A method of recycling a recycleable element, comprising the steps of:
   (1) providing visual indicia to indicate the number of times said element can be recycled, said visual indicia adapted to be updated and being disposed on said element;
   (2) updating the visual indicia each time said element is recycled; and
   (3) retiring said element after said visual indicia can no longer be updated.

18. The method of recycling a recycleable element as recited in claim 17, wherein further said step of providing visual indicia includes providing a plurality of indicia, wherein each indicia of said plurality is representative of a distinct number of times recycleable, beginning with a maximum number and consecutively decreasing to a minimum number.

19. The method of recycling a recycleable element as recited in claim 18, wherein said step of updating said visual indicia includes permanently marking said visual indicia, said marking initially being done to said indicia representative of said maximum number of times recycleable and thereafter being done consecutively in decreasing order each time said element is recycled.

20. The method of recycling a recycleable element as recited in claim 19, wherein said step of retiring includes salvaging reuseable components of said element.

* * * * *